(12) United States Patent
Hur (10) Patent No.: US 8,799,899 B2
(45) Date of Patent: Aug. 5, 2014

(54) CONTROLLING AND SELECTING CLOUD CENTERS BASED ON ELECTRICITY AND CARBON EMISSION COSTS

(75) Inventor: Tae-Sung Hur, Seoul (KR)

(73) Assignee: KT Corporation, Gyeonggi-do (KR)

(*) Notice: Subject to any disclaimer, the term of this patent is extended or adjusted under 35 U.S.C. 154(b) by 310 days.

(21) Appl. No.: 13/420,754

(22) Filed: Mar. 15, 2012

(65) Prior Publication Data

US 2012/0240113 A1    Sep. 20, 2012

(30) Foreign Application Priority Data

Mar. 15, 2011    (KR) .................. 10-2011-0022889

(51) Int. Cl.
*G06F 9/455*    (2006.01)
*G06F 15/16*    (2006.01)
*G06F 1/00*    (2006.01)

(52) U.S. Cl.
USPC ................. 718/1; 709/201; 713/300

(58) Field of Classification Search
None
See application file for complete search history.

(56) References Cited

U.S. PATENT DOCUMENTS

| | | | |
|---|---|---|---|
| 7,937,701 B2 | 5/2011 | Kinney et al. | |
| 2009/0112522 A1 | 4/2009 | Rasmussen | |
| 2009/0228726 A1* | 9/2009 | Malik et al. | 713/320 |
| 2010/0153960 A1 | 6/2010 | Youn et al. | |
| 2010/0251329 A1* | 9/2010 | Wei | 726/1 |
| 2010/0281095 A1* | 11/2010 | Wehner et al. | 709/201 |
| 2010/0306354 A1 | 12/2010 | DeHaan et al. | |
| 2010/0306566 A1 | 12/2010 | DeHaan et al. | |
| 2010/0325191 A1 | 12/2010 | Jung et al. | |
| 2010/0332262 A1* | 12/2010 | Horvitz et al. | 705/4 |
| 2011/0016214 A1* | 1/2011 | Jackson | 709/226 |
| 2011/0072293 A1* | 3/2011 | Mazzaferri et al. | 713/340 |
| 2012/0084414 A1* | 4/2012 | Brock et al. | 709/221 |

FOREIGN PATENT DOCUMENTS

| | | |
|---|---|---|
| KR | 10-2010-0069538 A | 6/2010 |
| KR | 10-2010-0090255 A | 8/2010 |
| KR | 10-2010-0092850 A | 8/2010 |
| KR | 10-0992291 B1 | 11/2010 |
| KR | 10-2010-0138689 A | 12/2010 |
| KR | 10-2011-0000889 A | 1/2011 |

OTHER PUBLICATIONS

Beloglazov et al. "Energy Efficient Resource Management in Virtualized Cloud Data Centers". 2010 10th IEEE/ACM International Conference on Cluster, Cloud and Grid Computing. 2010.*

Brebner et al. "Modeling Cloud Cost and Performance". Annual International Conference on Cloud Computing and Virtualization. 2010.*

(Continued)

*Primary Examiner* — Adam Lee
(74) *Attorney, Agent, or Firm* — IP Legal Services, LLC (57) ABSTRACT

Provided are apparatus and method for managing a plurality of cloud centers that provide a virtual computing environment to a client. The method may include selecting a target cloud center from the plurality of cloud centers based on electricity costs and carbon emission costs of the plurality of cloud centers, and controlling the selected target cloud center so as to manage at least one virtual machine to provide the virtual computing environment to the client. For the selecting the target cloud center, a cloud center having a lowest electric cost and a lowest carbon emission cost may be selected from the plurality of cloud center as the target cloud center. Then, the selected target cloud center may be controlled so as to create a virtual machine.

18 Claims, 4 Drawing Sheets

(56) References Cited

OTHER PUBLICATIONS

Garg et al. "Environment-conscious scheduling of HPC applications on distributed Cloud-oriented data centers". Journal of Parallel and Distributed Computing. May 11, 2010.*

Mazzucco et al. "Maximizing Cloud Providers Revenues via Energy Aware Allocation Policies". Feb. 15, 2011.*

Yamplosky. "An Evaluation of the Power Consumption and Carbon Footprint of a Cloud Infrastructure". Edinburgh Napier University. Dec. 2010.*

* cited by examiner

CONTROLLING AND SELECTING CLOUD CENTERS BASED ON ELECTRICITY AND CARBON EMISSION COSTS

CROSS REFERENCE TO PRIOR APPLICATIONS

The present application claims priority under 35 U.S.C. §119 to Korean Patent Application No. 10-2011-0022889 (filed on Mar. 15, 2011), which is hereby incorporated by reference in its entirety.

FIELD OF THE INVENTION

The present invention relates to cloud computing and, in particular, to controlling and selecting a cloud center.

BACKGROUND OF THE INVENTION

Lately, cloud computing has been introduced that may provide computing as a service using resources distributed over a network. For example, cloud computing may provide computation, software applications, data access, data management, and storage resources without requiring users to know the location and other details of the computing infrastructure. Such cloud computing can be defined as on-demand outsourcing service provided through a communication network. In a cloud computing environment, a service provider may form cloud centers by virtually integrating resources distributed over a communication network and provide a cloud service to a user through the cloud centers. Such a cloud center may be a basic unit to provide a cloud service in cloud computing environment. In order to provide the cloud service to a client, the cloud center may create at least one virtual machine using associated resources, such as a computing node and a storage node.

A plurality of cloud centers distributed over global regions may form a global cloud center network. Since cloud centers are distributed over global regions in a global cloud center network, the global cloud center network may have high fault tolerance because of geographical characteristics. For example, in general, a processing load of a cloud center may be high during the day time and low at night time. A cloud center located at Seoul, Korea may have a high processing load at a day time. In this case, a cloud center located at New York, U.S. may be allocated to users to provide the cloud service because the cloud center is located at New York during night time. For another example, a cloud center located at Tokyo, Japan may not be in operation due to an earthquake or other malfunction. In this case, a cloud center located in Seoul, Korea may be allocated to a client to provide the cloud service. As described above, a global cloud center network may have many merits and efficiently provide a cloud service to clients.

Lately, the problems of global warming have received great attention from the general public and scientific community. The International environmental treaty, United Nations Framework Convention on Climate Change (UNFCCC), has defined the Kyoto protocol in order to attempt to reduce further climate change. The Kyoto protocol defines a carbon emission credit, provides a mechanism for allocating carbon credits to countries, and countries are regulated to emit a green house gas, such as a carbon-dioxide and a carbon monoxide gas, based on their allocated carbon emission credits. A lot of effort has been made to reduce emission of green house gas in various fields.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a cloud center controlling server may manage a plurality of cloud centers that provide virtual computing environments to clients by allocating at least one virtual machine to clients.

In accordance with another aspect of the present invention, a cloud center controlling server may select a cloud center to create a virtual machine or to terminate a virtual machine based on an electricity cost and a carbon emission cost.

In accordance with another aspect of the present invention, a cloud center controlling server may reduce carbon gas emission by selecting a cloud center based on an electricity cost and a carbon emission cost.

In accordance with an exemplary embodiment of the present invention, a method may be provided for managing a plurality of cloud centers providing a virtual computing environment to a client. The method may include selecting a target cloud center from the plurality of cloud centers based on electricity costs and carbon emission costs of the plurality of cloud centers, and controlling the selected target cloud center so as to manage at least one virtual machine to provide the virtual computing environment to the client.

For the selecting the target cloud center, a cloud center having a lowest electric cost and a lowest carbon emission cost may be selected from the plurality of cloud center as the target cloud center. Then, the selected target cloud center may be controlled so as to create a virtual machine.

For the selecting the target cloud center, a cloud center having a highest electric cost and a highest carbon emission cost may be selected from the plurality of cloud center as the target cloud center. The selected target cloud center may be controlled so as to terminate a virtual machine.

The selecting the target cloud center may include calculating selection weights of the plurality of cloud centers by combining an electricity cost and a carbon emission cost of each cloud center, selecting a cloud center having a lowest selection weight from the plurality of cloud centers as the target cloud center so as to create the virtual machine, and selecting a cloud center having a highest selection weight from the plurality of cloud centers as the target cloud center so as to terminate the virtual machine.

The method may further include calculating the electricity cost based on an amount of electricity usage in each cloud center and a unit cost per unit electricity.

The method may further include determining the unit cost per unit electricity based on information provided from an electricity service provider.

The method may further include calculating the carbon emission cost based on an amount of carbon gas emitted at each cloud center and a carbon credit price.

The method may further include determining the carbon credit price based on information provided from a carbon market.

The method may further include selecting at least one candidate cloud center from the plurality of cloud centers based on a service agreement level of a client and service capability levels of the plurality of cloud centers. The selecting the target cloud center may select from the selected at least one candidate cloud center based on an electricity cost and a carbon emission cost of the selected at least one candidate cloud center.

The selecting at least one candidate cloud center may include determining a service level of the client based on the service level agreement between the client and a service provider, comparing the service level of the client with the service capability levels of the plurality of cloud centers, and selecting a cloud center having a service capability level satisfying the service level of the client from the plurality of cloud centers as the candidate cloud center.

In accordance with another embodiment of the present invention, a method may be provided for managing a plurality of cloud centers providing a virtual computing environment to a client. The method may include selecting a target cloud center from the plurality of cloud centers based on an electricity usage amount and a carbon emission amount, and controlling the selected cloud center to manage at least one virtual machine so as to provide a requested service to the client.

The selecting a target cloud center may include selecting a cloud center consuming comparative low electricity and emitting comparative low carbon gas from the plurality of cloud centers as the target cloud center, and controlling the selected target cloud center so as to create a virtual machine.

The selecting a target cloud center may include selecting a cloud center consuming comparative large electricity and emitting comparative great carbon gas from the plurality of cloud centers as the target cloud center, and controlling the selected target cloud center so as to terminate a virtual machine.

The method may further include determining a service level of the client based on a service level agreement made between the client and a service provider, comparing the service level of the client with service capable levels of the plurality of cloud centers, and selecting cloud centers having a service capable level that satisfies the service level of the client from the plurality of cloud centers as candidate cloud centers. The selecting the target cloud center may select from the selected candidate cloud centers.

In accordance with another embodiment of the present invention, an apparatus may be provided for managing a plurality of cloud centers that provide a virtual computing environment to a client. The apparatus may include an electricity cost calculator, a carbon emission cost calculator, a cloud center selector, and a controller. The electricity cost calculator may be configured to calculate electricity costs of the plurality of cloud centers based on an amount of electricity usage in each cloud center and a unit cost per unit electricity. The carbon emission cost calculator may be configured to calculate carbon emission costs of the plurality of cloud centers based on an amount of carbon gas emitted at east cloud center and a carbon credit price. The cloud center selector may be configured to select a target cloud center from the plurality of cloud centers based on the electricity costs and the carbon emission costs of the plurality of cloud centers. The controller may be configured to control the selected target cloud center so as to manage at least one virtual machine to provide the virtual computing environment to the client.

The cloud center selector may select a cloud center having a lowest electricity cost and a lowest carbon emission cost from the plurality of cloud centers as the target cloud center. In this case, the controller may control the selected target cloud center so as to create at least one virtual machine.

The cloud center selector may select a cloud center having a highest electric cost and a highest carbon emission cost from the plurality of cloud center as the target cloud center. In this case, the controller may control the selected target cloud center so as to terminate a virtual machine.

The cloud center selector may calculate selection weights of the plurality of cloud centers by adding an electricity cost and a carbon emission cost of each cloud center, select a cloud center having a lowest selection weight from the plurality of cloud centers as the target cloud center to create a virtual machine, and select a cloud center having a highest selection weight from the plurality of cloud centers as the target cloud center to terminate a virtual machine.

The apparatus may further include a candidate selector. The candidate selector may be configured to select at least one candidate cloud center from the plurality of cloud centers based on a service agreement level of a client and service capable levels of the plurality of cloud centers. The target cloud center may be selected from the selected at least one candidate cloud center based on an electricity cost and a carbon emission cost of the selected at least one candidate cloud center.

The candidate selector may determine a service level of the client based on the service level agreement made between the client and a service provider, compare the service level of the client with the service capable levels of the plurality of cloud centers, and select a cloud center having a service capable level that satisfies the service level of the client from the plurality of cloud centers as the candidate cloud center.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, cloud centers distributed over global regions may be controlled and managed to minimize carbon gas emission while providing a cloud service to clients according to a service level defined in a service level agreement of each client. Particularly, when it is required to create a virtual machine for providing a requested service, a cloud center controlling server may select a cloud center that consumes comparative low electric power and generates relative less carbon gas when controlling the selected cloud center to create a virtual machine. Furthermore, when the requirement to terminate at least one existing virtual machine arises, a cloud center controlling server may i) select a cloud center that consumes comparative great electric power and relative large carbon gas and ii) control the selected cloud center so as to terminate at least one existing virtual machine at that location. In such a manner, carbon emission may be reduced while satisfying a service level of a client, such as might be defined in a service level agreement. Hereinafter, a cloud center controlling server in accordance with all embodiment of the present invention will be described with reference to FIG. 1.

Figure 1:
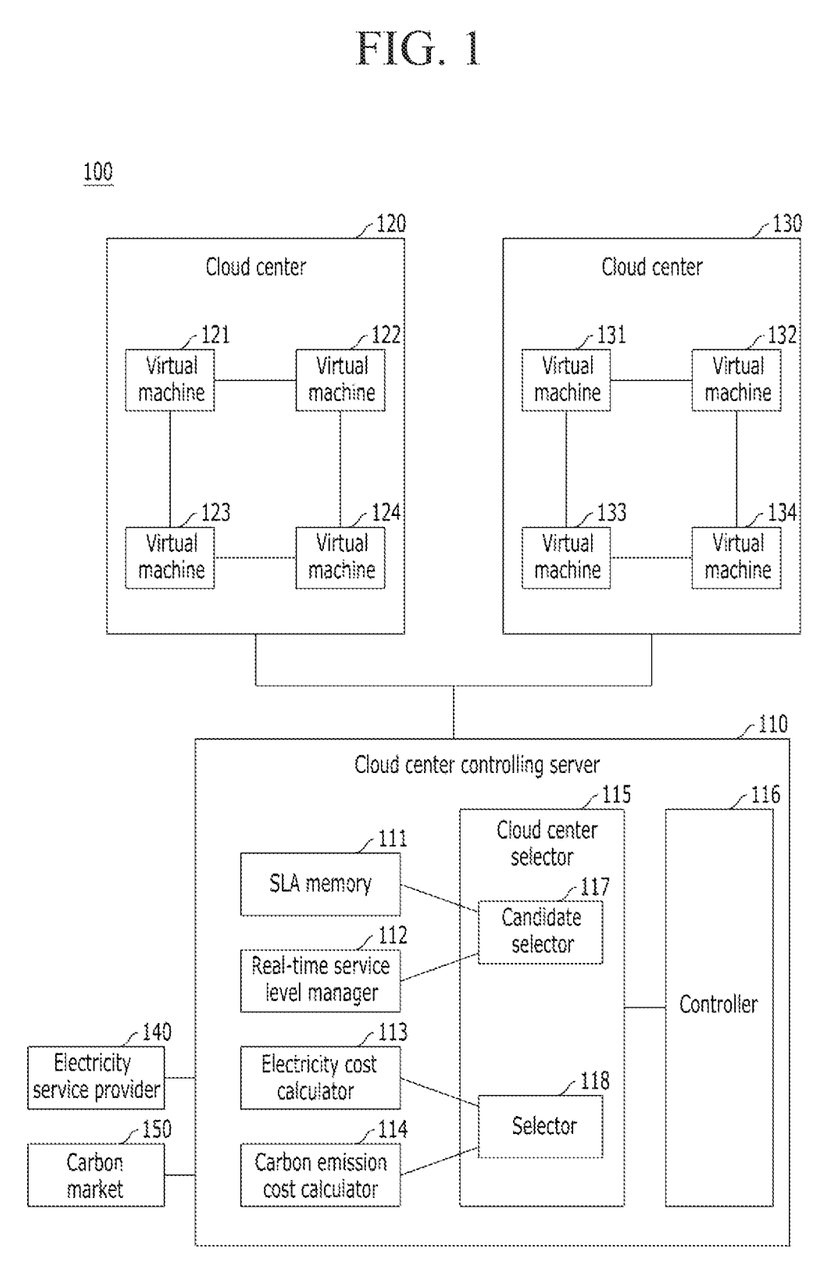
FIG. 1 illustrates a global cloud center network in accordance with an exemplary embodiment of the present invention.

FIG. 1 illustrates a global cloud center network in accordance with an exemplary embodiment of the present invention.

Referring to FIG. 1, global cloud center network 100 may include a plurality of cloud centers 120 and 130 and cloud center controlling server 110. Cloud centers 120 and 130 may be distributed over global regions and coupled with each other through a communication network. Cloud center 120 may include a plurality of virtual machines 121-124, and cloud center 130 may include a plurality of virtual machines 131-134. Cloud centers 120 and 130 may create virtual machines 121-124 or 131-134 using computing resources belonging to each respective cloud center. For example, cloud centers 120 and 130 may be a group of computing resources coupled through a communication network in a certain area. Cloud centers 120 and 130 may control the associated computing resources to provide a requested service to clients. For example, cloud centers 120 and 130 may provide a virtual computing environment to clients using associated computing resources. In order to provide such a virtual computing environment to clients, cloud centers 120 and 130 may create virtual machines and manage virtual machines 121-124 and 131-134, respectively, for example, terminating existing virtual machines, migrating a virtual machine from one cloud center to another, and allocating virtual machines to a client.

Cloud center controlling server 110 may be coupled to cloud centers 120 and 130. Cloud center controlling server 110 may manage and control cloud centers 120 and 130. Although FIG. 1 illustrates cloud center controlling server 110 managing two cloud centers 120 and 130, the present invention is not limited thereto. For example, more than two cloud centers may be coupled to and managed by cloud center controlling server 110. Particularly, cloud center controlling server 110 may control cloud centers 120 and 130 to create a new virtual machine, migrate an existing virtual machine from one cloud center to another, and to terminate an existing virtual machine in order to provide a service to a client in accordance with an embodiment of the present invention.

Cloud center controlling server 110 may include service level agreement (SLA) memory 111, real-time service level manager 112, electricity cost calculator 113, carbon emission cost calculator 114, cloud center selector 115, and controller 116. Cloud center selector 115 may include candidate selector 117 and selector 118. Cloud center controlling server 110 may be coupled to electricity service provider 140 and carbon market 150 for receiving information on a unit cost per unit electricity and information on a carbon emission cost.

SLA memory 111 may store information on service level agreement (SLA) associated with each client. The SLA is part of a service contract between a client and a service provider. The SLA may define levels of a service provided to a client. For example, the SLA may define service levels such as a data rate, data availability, jitter, and similar measurable quantities.

Real-time service level manager 112 may monitor and manage a service capable level of each cloud center. For example, real-time service level manager 112 may monitor cloud centers 120 and 130 in real time and determine a real time service capability level of each cloud center 120 and 130. The real-time service capability level may denote a level of service that a cloud center can provide to a client in real time. Such a real-time service capability level may differ according to a processing load and a communication environment of a cloud center. The real-time capability level of service may be used to determine whether or not a respective cloud center is a proper candidate to create a virtual machine for providing a requested service.

Electricity cost calculator 113 may calculate an electricity cost to be charged to cloud center 120 or 130 according to an amount of electricity used in cloud center 120 or 130. For example, electricity cost calculator 113 may calculate a unit cost per unit electricity for convenience in comparison and calculation.

Lately, a real-time pricing system has been created for charging a user for an electricity cost. The real-time pricing system is introduced to optimize effective usage of electricity energy. In the real-time pricing system, an electricity cost may differ according to a time period of the day or week such as, for example, during the day time and during the night time. Accordingly, an electricity service provider may provide information on a unit electricity cost of each time period to consumers. Based on this information, consumers may minimize their electricity cost by wisely using the electricity service during various periods of the day and/or week. When a real-time pricing system is applied to a cloud center, electricity cost calculator 113 may use a different method for calculating an electricity cost of a cloud center based on time period(s).

When a real-time pricing system is applied to a cloud center, electricity cost calculator 113 may receive information on an electricity cost rate, which varies according to a time period, from an external system. For example, electricity cost calculator 113 may receive such information from electricity service provider 140. Electricity cost calculator 113 may calculate an electricity cost based on the received information. When a real-time pricing system is not applied to a cloud center, electricity cost calculator 113 may refer to a fixed electricity cost rate to calculate an electricity cost.

Carbon emission cost calculator 114 may calculate a carbon emission cost according to an amount of electricity used in each cloud center. The carbon emission cost may be calculated as a unit carbon emission cost per unit electricity usage for convenience in comparison and estimation. For example, carbon emission cost calculator 114 may calculate a carbon emission cost by multiplying a carbon emission amount per a unit electricity usage with a carbon emission cost rate that may be changed in real time. Information on the carbon emission cost rate may be provided in real time from an external system, such as carbon market 150. The carbon emission amount per unit electricity usage may be previously defined according to a location of a cloud center. In this case, the defined carbon emission amount per unit electricity usage may be used for calculating a carbon emission cost in carbon emission cost calculator 114. When the carbon emission amount per unit electricity usage is not defined, the carbon emission amount per unit electricity usage may be calculated based on a power generation method of an electricity service provider associated with a given cloud center. Accordingly, carbon emission cost calculator 114 may differently calculate a carbon emission cost according to a power generation method.

For example, electricity may be generated in the Republic of Korea through a nuclear power plant, a thermoelectric power plant, and a hydroelectric dam. In this case, a carbon emission amount per unit electricity usage may be about 0.495 kg/kwh (0.000495 tone/kwh) according to Korea LCI Database Information Network. A carbon emission price may be about 15 Euro per one tone at Europe carbon market. Under such assumptions, a carbon emission cost of a cloud center located at Korea may be calculated by 0.000495×15. As a result, the carbon emission cost may be about 0.007425

Euro/kwh. Since other countries use different method for generating electricity, cloud centers located at the other countries may have different carbon emission costs.

Cloud center selector 115 may select one of cloud centers 120 and 130 based on the real-time service capable levels, the electricity costs, and the carbon emission costs of cloud centers 120 and 130. In order to select a cloud center and/or virtual machine of a cloud center, cloud center selector 115 may include candidate selector 117 and selector 118. Candidate selector 117 may select at least one candidate cloud center having a real-time service capability level that can satisfy a service level agreement of a client. For example, candidate selector 117 may compare a real-time service capability level of each cloud center with a service level defined in a service level agreement of a client. When a cloud center having a real-time service capability level satisfies the service level agreement of a client, the cloud center may be selected as a candidate cloud center. Selector 118 may select one from the candidate cloud centers based on electricity costs and carbon emission costs of the candidate cloud centers. For example, when it is required to create a virtual machine, selector 118 may select one having a lowest electricity cost and a lowest carbon emission cost among the candidate cloud centers. When it is required to terminate a virtual machine, selector 118 may select one having a highest electricity cost and a highest carbon emission cost among the candidate cloud centers. Controller 116 may control the selected cloud center to create a virtual machine or to terminate an existing virtual machine.

As described above, a cloud center controlling server may select at least one cloud center from a global cloud center network based on a service level agreement, an electricity cost, and a carbon emission cost of a cloud center in accordance with an embodiment of the present invention. Hereinafter, a method for selecting a cloud center in accordance with an embodiment of the present invention will be described with reference to FIG. 2.

Figure 2:
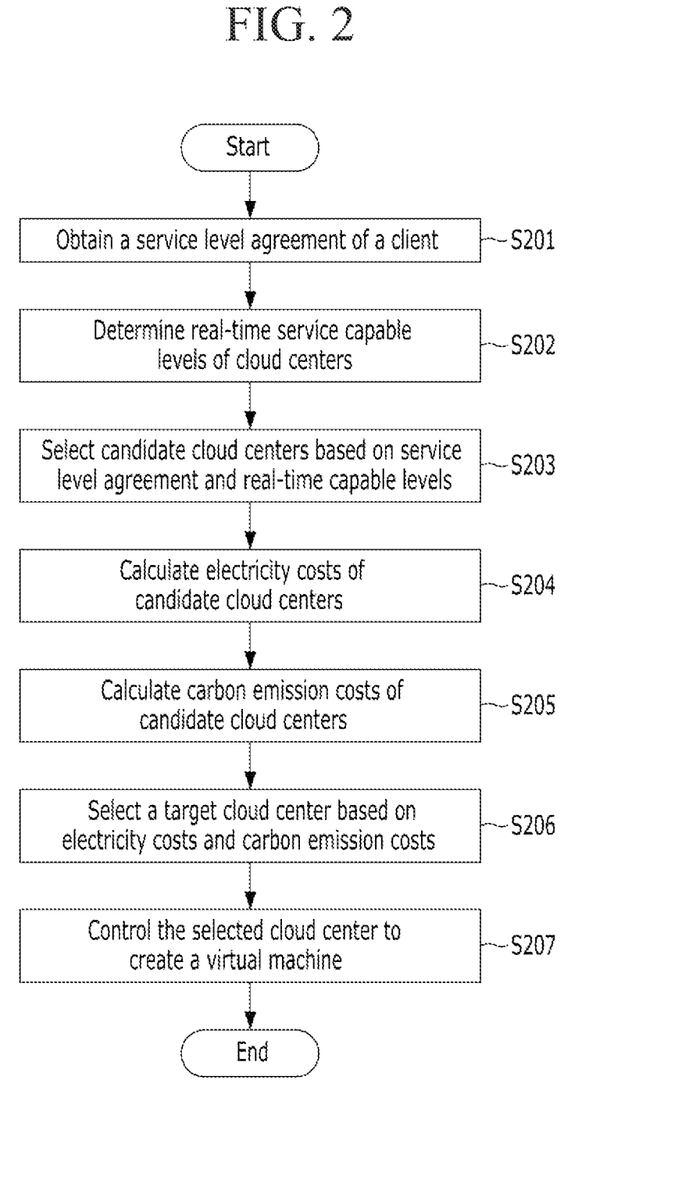
FIG. 2 illustrates a method for selecting a cloud center in accordance with an embodiment of the present invention.

FIG. 2 illustrates a method for selecting a cloud center in accordance with an embodiment of the present invention.

When the requirement arises to provide a virtual computing environment to a client, a cloud center may be controlled to create a virtual machine. In this case, a cloud center that emits less carbon gas may be selected from a global cloud center network. In order to select the cloud center that emits less carbon gas, a following operation may be performed in accordance with an embodiment of the present invention.

Referring to FIG. 2, a service level of a client may be determined at step S201. The service level may be defined in a service level agreement made between a client and a service provided. For example, the service level of the client may be determined based on SLA information stored in SLA memory 111.

At step S202, real-time service capability levels of cloud centers in a global cloud center network may be determined. The real-time service capability level may denote a service level that a cloud center can provide to the client. For example, real-time service level manager 112 may monitor and determine a real-time service capability level of each cloud center.

At step S203, candidate cloud centers may be selected from cloud centers included in the global cloud center network. For example, in order to select candidate cloud centers, the service level of the client may be compared with the real-time service capable levels of cloud centers included in the global cloud center network. When a cloud center has a real-time service capable level that satisfies the service level of the client, such a cloud center may be selected as the candidate cloud center. For example, candidate selector 117 of cloud center selector 115 may select candidate cloud centers by comparing the real-time service capable levels of cloud centers with a service level defined in a service level agreement of a client.

After selecting the candidate cloud centers, electricity costs of the candidate cloud centers may be calculated at step S204. For example, electricity cost calculator 113 may calculate electricity costs of the candidate cloud centers. Electricity cost calculator 113 may calculate an electricity cost of each cloud center according to an amount of electricity used in each cloud center. For convenience in comparison and calculation, a unit cost per unit electricity may be calculated. When a real-time pricing system is applied to a cloud center, electricity costs may differ according to time period. Furthermore, real-time electricity cost information may be obtained from an external system, for example, a server of an electricity service provider 140.

At step S205, carbon emission costs of the selected candidate cloud centers may be calculated. For example, the carbon emission cost may be estimated based on a carbon credit price. The carbon credit may be a certificate or a permission to emit one tone of carbon dioxide or the mass of another greenhouse gas with a carbon dioxide equivalent ($CO_2$) equivalent to one tone of carbon dioxide. The carbon credit is traded in a market with a carbon credit price. The carbon credit price may be changed in real time. The carbon emission cost may be calculated by multiplying a carbon credit price with a carbon emission amount per a unit of power usage in each cloud center. For example, carbon emission cost calculator 114 may receive information on a carbon credit price in real time from carbon market 150 and calculate carbon emission costs of the candidate cloud centers by multiplying the carbon credit price with a carbon emission amount per a unit of power usage in the candidate cloud centers.

The above described steps were described as being performed in series, but the present invention is not limited thereto. For example, the above steps S201 to S205 may be performed in parallel. Furthermore, an order of performing the steps may be changed in another embodiment of the present invention. For example, candidate cloud centers may be selected after calculating electricity costs and carbon emission costs for cloud centers in a global cloud center network.

At step S206, one cloud center may be selected from the candidate cloud centers based on the electricity costs and the carbon emission costs. For example, one cloud center having the smallest electricity cost and the smallest carbon emission cost may be selected as a target cloud center. Alternatively, a selection weight of each candidate cloud center may be calculated by adding an electricity cost and a carbon emission cost of each candidate cloud center. After calculating a selection weight, one having the smallest selection weight may be selected from the candidate cloud centers as a target cloud center.

At step S207, the selected target cloud center may be controlled to create a virtual machine. For example, controller 116 may control the selected cloud center to create a virtual machine to provide a service to a client.

As described above, a cloud center consuming a comparative less electricity and emitting a comparative less carbon gas may be selected to create a virtual machine to provide a requested service to a client. In this manner, overall carbon emission may be significantly reduced.

In order to efficiently manage limited cloud computing resources distributed over a network, a requirement might arise to reduce the number of virtual machines in cloud centers. In this case, cloud centers that consume a comparatively great amount of electricity and emit comparatively large amount of mass of carbon gas may be selected to terminate a virtual machine in accordance with an embodiment of the present invention. Such operation will be described with reference to FIG. 3, hereinafter.

Figure 3:
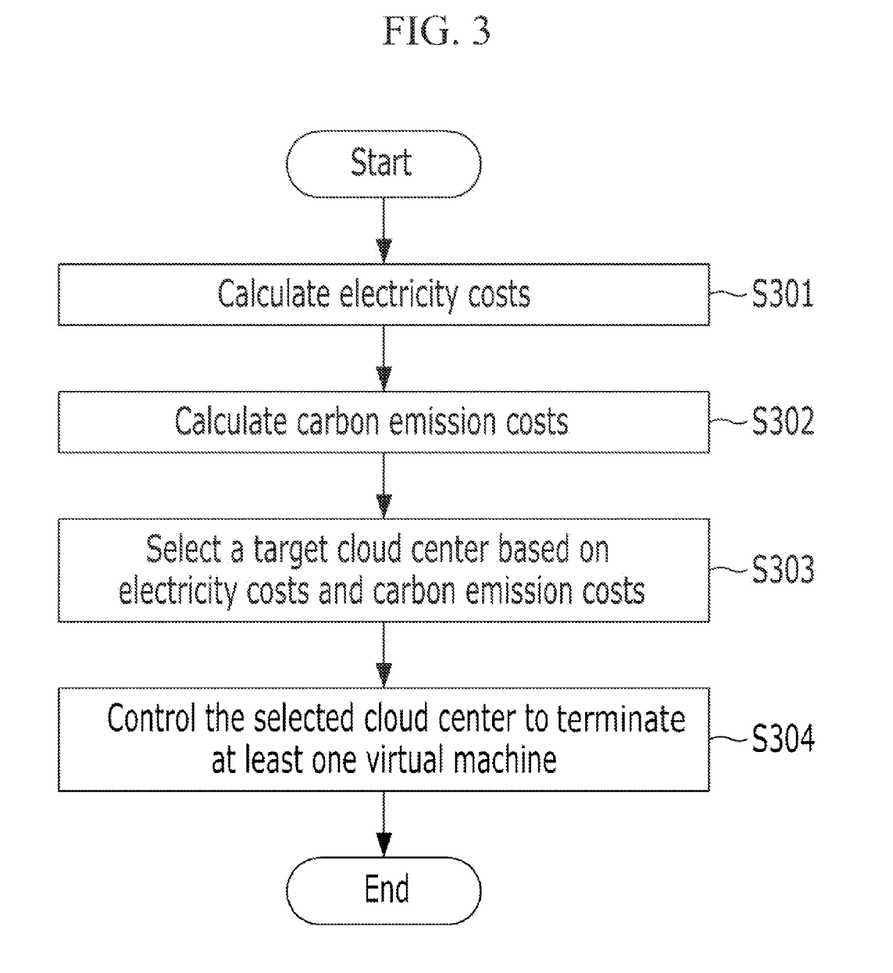
FIG. 3 illustrates a method for selecting a cloud center in order to reduce the number of virtual machines in operation in accordance with an embodiment of the present invention.

FIG. 3 illustrates a method for selecting a cloud center in order to reduce the number of virtual machines in operation in accordance with an embodiment of the present invention.

Referring to FIG. 3, electricity costs and carbon emission costs of cloud centers in a global cloud center network may be calculated at steps S301 and S302. Since calculation of electric costs and carbon emission costs were described above, detailed descriptions thereof will be omitted herein.

At step S303, a target center may be selected based on the calculated electricity costs and carbon emission costs. For example, a cloud center having the highest electricity cost and the highest carbon emission cost may be selected as a target cloud center. Alternatively, a selection weight of each cloud center may be calculated by adding an electricity cost and a carbon emission cost of each cloud center. After calculating the selection weight of each cloud center, one having the largest selection weight may be selected from the candidate cloud centers as a target cloud center.

At step S304, the selected target cloud center may be controlled to terminate at least one virtual machine belonging to the target cloud center.

As described above, a cloud center consuming comparatively large electricity and emitting comparatively great carbon gas may be selected to terminate at least one virtual machine belonging thereto. Accordingly, overall carbon emission may be reduced in accordance with an embodiment of the present invention.

Figure 4:
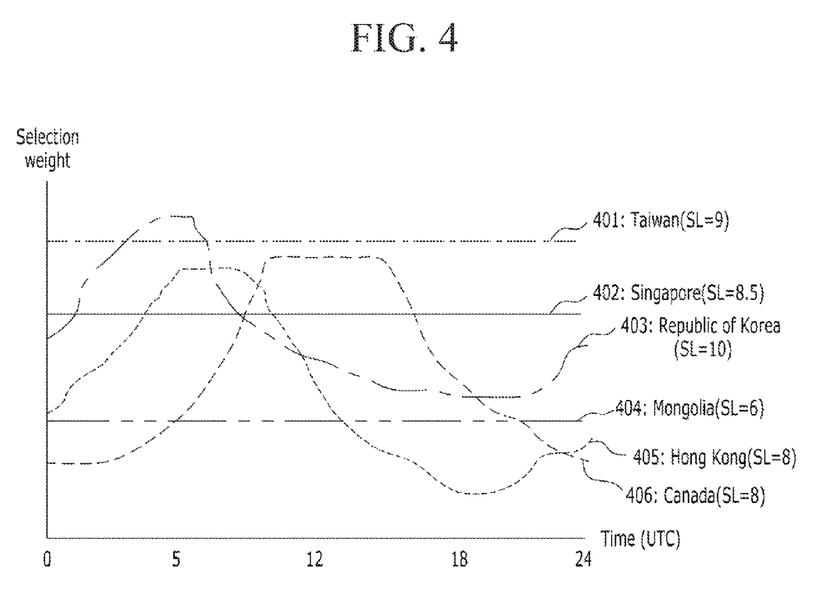
FIG. 4 is a graph for describing selecting a cloud center to create a virtual machine or to terminate a virtual machine in accordance with an embodiment of the present invention.

FIG. 4 is a graph for describing selecting a cloud center to create a virtual machine or to terminate a virtual machine in accordance with an embodiment of the present invention.

As illustrated in FIG. 4, the graph shows selection weights changed according to time and a location of a cloud center. A selection weight may denote a reference value for selecting a cloud node. Such a selection weight may be defined as an adding result of a unit electricity cost per unit electricity usage and a carbon emission cost. For example, a cloud center controlling system may select a cloud center based on the selection weights of cloud centers. The unit electricity cost may be changed according to time and the carbon emission cost may be changed according to a location of a cloud center.

A y-axis of the graph denotes a selection weight and an x-axis denotes a time (Universal time coordinated: UTC). For example, the graph may include six curves 401 to 406. Each curve may denote a selection weight of a cloud center located at a certain region. Curve 401 may illustrate selection weight variation of cloud center located at Taiwan. Curve 402 may show selection weight variation of cloud center located at Singapore. Curve 403 may show selection weight variation of cloud center located at Republic of Korea. Curve 404 may show selection weight variation of cloud center located at Mongolia. Curve 405 may show selection weight variation of cloud center located at Hong Kong. Curve 406 may show selection weight variation of cloud center located at Canada. As shown in the graph, Taiwan cloud center may have a real-time service capable level of 9.0. Singapore cloud center may have a real-time service capable level of 8.5. Korea cloud center may have a real-time service capable level of 10. Mongolia cloud center may have a real-time service capable level of 6.0. Hong-Kong cloud center may have a real-time service capable level of 8.0. Canada cloud center may have a real-time service capable level of 8.0.

Such a graph may be used to select a cloud center to create a virtual machine or to terminate a virtual machine. For example, when a virtual machine is desirably created at 3 o'clock (UTC) for a client having a service level agreement to have a service level of 8.5, Taiwan, Singapore, and Korea cloud centers may be selected as candidate cloud centers because Taiwan, Singapore, and Korea cloud centers have the real-time service capable levels of 9, 8.5, and 10. Among Taiwan, Singapore, and Korea cloud centers, Singapore cloud center may be selected as a target cloud center to create a virtual machine for providing a requested service to the client because Singapore cloud center has the lowest selection weight at 3 o'clock.

For another example, in order to effectively use computing resources in a global cloud center network, it may be necessary to reduce the number of virtual machines. When the number of virtual machines may be required to be reduced at 14 o'clock (UTC), a cloud center having the highest selection weight at 14 o'clock may be selected. For example, virtual machines belonging to the Singapore, Korea, and Mongolia cloud centers are in operation at 14 o'clock. Among Singapore, Korea, and Mongolia cloud centers, Singapore cloud center may be selected to terminate at least one virtual machine because Singapore cloud center has the highest selection weight at 14 o'clock as compared to Korea cloud center and Mongolia cloud center.

As described above, an operation cost including an electricity cost and a carbon emission cost can be maintained in minimum while satisfying a service level defined in a service level agreement between a client and a service provider.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X ploys A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of managing a plurality of cloud centers providing a virtual computing environment to a client, the method comprising:

calculating electricity costs of the plurality of cloud centers based on an amount of electricity usage in each cloud center and a unit cost per unit of electricity;

calculating carbon emission costs of the plurality of cloud centers based on an amount of carbon gas emitted at each cloud center and a carbon credit price;

calculating selection weights for the plurality of cloud centers by adding an electricity cost and a carbon emission cost of each cloud center; and selecting a cloud center having the lowest selection weight from the plurality of cloud centers as the cloud center to create a virtual machine.

2. The method of claim 1, wherein selecting a cloud center includes:

selecting a cloud center having the highest selection weight from the plurality of cloud centers as the cloud center to terminate a virtual machine.

3. The method of claim 1, comprising determining the unit cost per unit of electricity based on information provided from an electricity service provider.

4. The method of claim 1, comprising determining the carbon credit price based on information provided from a carbon market.

5. The method of claim 1, further comprising:

selecting at least one candidate cloud center from the plurality of cloud centers based on a service level agreement of the client and service capability levels of the plurality of cloud centers, wherein the selecting the target cloud center selects from the selected at least one candidate cloud center based on an electricity cost and a carbon emission cost of the selected at least one candidate cloud center.

6. The method of claim 5, wherein the selecting at least one candidate cloud center includes:

determining a service level of the client based on the service level agreement between the client and a service provider;

comparing the service level of the client with the service capability levels of the plurality of cloud centers; and selecting a cloud center having a service capability level satisfying the service level of the client from the plurality of cloud centers as the candidate cloud center.

7. An apparatus for managing a plurality of cloud centers that provide a virtual computing environment to a client, the apparatus comprising:

a cloud center controlling server;

an electricity cost calculator configured to calculate electricity costs of the plurality of cloud centers based on an amount of electricity usage in each cloud center and a unit cost per unit of electricity;

a carbon emission cost calculator configured to calculate carbon emission costs of the plurality of cloud centers based on an amount of carbon gas emitted at each cloud center and a carbon credit price;

a cloud center selector configured to:

calculate selection weights for the plurality of cloud centers by adding an electricity cost and a carbon emission cost of each cloud center; and select the cloud center having the lowest selection weight from the plurality of cloud centers as the cloud center to create a virtual machine.

8. The apparatus of claim 7, wherein:

the cloud center selector selects a cloud center having the selection weight from the plurality of cloud centers as the cloud center to terminate a virtual machine.

9. The apparatus of claim 7, further comprising:
a candidate selector configured to select at least one candidate cloud center from the plurality of cloud centers based on a service level agreement of the client and service capable levels of the plurality of cloud centers, wherein the target cloud center is selected from the selected at least one candidate cloud center based on an electricity cost and a carbon emission cost of the selected at least one candidate cloud center.

10. The apparatus of claim 9, wherein the candidate selector:
determines a service level of the client based on the service level agreement made between the client and a service provider;
compares the service level of the client with the service capable levels of the plurality of cloud centers; and
selects a cloud center having a service capable level that satisfies the service level of the client from the plurality of cloud centers as the candidate cloud center.

11. The apparatus of claim 7, wherein the electricity cost calculator is further configured to: determine the unit cost per unit of electricity based on information provided from an electricity service provider.

12. The apparatus of claim 7, wherein the carbon emission cost calculator is further configured to: determine the carbon credit price based on information provided from a carbon market.

13. A non-transitory computer readable medium, which when executed, performs a method of managing a plurality of cloud centers providing a virtual computing environment to a client, the method comprising:
calculating electricity costs of the plurality of cloud centers based on an amount of electricity usage in each cloud center and a unit cost per unit of electricity;
calculating carbon emission costs of the plurality of cloud centers based on an amount of carbon gas emitted at each cloud center and a carbon credit price;
calculating selection weights for the plurality of cloud centers by adding an electricity cost and a carbon emission cost of each cloud center; and
selecting a cloud center having the lowest selection weight from the plurality of cloud centers as the cloud center to create a virtual machine.

14. The non-transitory computer readable medium of claim 13, wherein selecting a target cloud center includes:
selecting a cloud center having the highest selection weight from the plurality of cloud centers as the cloud center to terminate a virtual machine.

15. The non-transitory computer readable medium of claim 13, wherein the selecting a target cloud center includes:
selecting at least one candidate cloud center from the plurality of cloud centers based on a service level agreement of the client and service capability levels of the plurality of cloud centers,
wherein the selecting the target cloud center selects from the selected at least one candidate cloud center based on an electricity cost and a carbon emission cost of the selected at least one candidate cloud center.

16. The non-transitory computer readable medium of claim 15, further comprising:
determining a service level of the client based on the service level agreement between the client and a service provider;
comparing the service level of the client with the service capability levels of the plurality of cloud centers; and
selecting a cloud center having a service capability level satisfying the service level of the client from the plurality of cloud centers as the candidate cloud center.

17. The non-transitory computer readable medium of claim 13, further comprising determining the unit cost per unit of electricity based on information provided from an electricity service provider.

18. The non-transitory computer readable medium of claim 13, further comprising determining the carbon credit price based on information provided from a carbon market.

* * * * *